(12) United States Patent
Yamabana et al.

(10) Patent No.: US 7,676,152 B2
(45) Date of Patent: Mar. 9, 2010

(54) OPTICAL POWER MONITOR FOR PON TELECOMMUNICATION

(75) Inventors: Tetsuji Yamabana, Kawasaki (JP); Kazuyuki Mori, Kawasaki (JP); Satoshi Ide, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 722 days.

(21) Appl. No.: 11/528,374

(22) Filed: Sep. 28, 2006

(65) Prior Publication Data

US 2008/0002973 A1    Jan. 3, 2008

(30) Foreign Application Priority Data

Jun. 30, 2006    (JP) .............................. 2006-180811

(51) Int. Cl.
*H04B 10/08* (2006.01)

(52) U.S. Cl. .................. 398/38; 398/202; 398/208; 398/209; 398/33; 398/177; 250/214 A; 250/214 LA; 250/214 AG; 250/214 R; 250/214 C; 330/59; 330/308; 375/317; 375/318

(58) Field of Classification Search .................. 398/208, 398/209, 213, 214, 38, 70, 71, 72, 66, 67, 398/68, 158, 159, 135, 136, 137, 33, 202, 398/177; 250/214 A, 214 C, 214 R, 214 AG, 250/214 LA; 330/59, 308; 375/317, 318
See application file for complete search history.

(56) References Cited

U.S. PATENT DOCUMENTS

| 6,246,282 | B1 | 6/2001 | Oono et al. | |
| 7,495,203 | B2* | 2/2009 | Kaku et al. | ............. 250/214 A |
| 2006/0275043 | A1* | 12/2006 | Akashi et al. | ................ 398/208 |

FOREIGN PATENT DOCUMENTS

JP    A-2000-151290    5/2000

* cited by examiner

*Primary Examiner*—Hanh Phan
(74) *Attorney, Agent, or Firm*—Staas & Halsey LLP

(57) ABSTRACT

In an optical telecommunication system in which an intensity of an arriving optical signal is different for each packet, detected is an optical intensity for each packet with little error. For this purpose, contrived is to detect an average optical intensity across header parts for each packet by focusing on the fact that the header part comprising the preamble and delimiter of a packet is in a bit pattern which includes approximately the same numbers of "0" and "1".

8 Claims, 6 Drawing Sheets

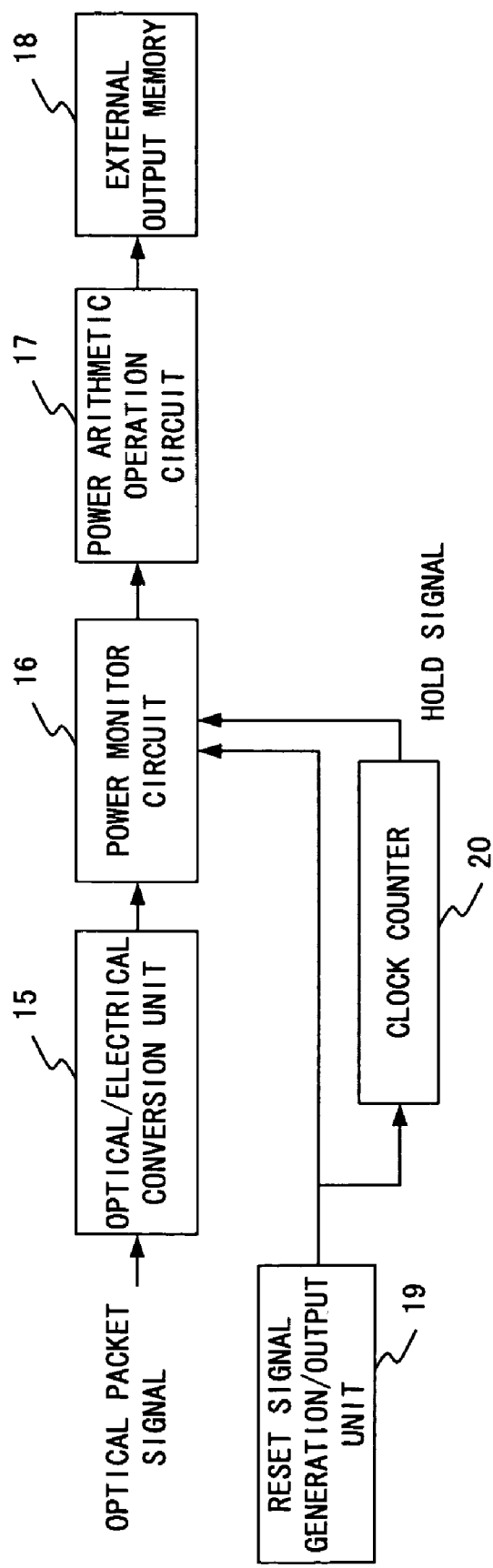
F I G. 3

OPTICAL POWER MONITOR FOR PON TELECOMMUNICATION

BACKGROUND OF THE INVENTION

1. Field of the Invention

The present invention relates to an optical monitor for use in a reception unit of an optical line terminal (OLT) in a high speed passive optical network (PON).

2. Description of the Related Art

FIG. 1 is a diagram describing a PON telecommunication system.

The PON telecommunication system is one in which an optical star coupler 10 receives an optical signal from each of clients ONU #1 through #3 and transmits it to an OLT 11. An optical signal from each of the clients ONU#1 through #3 is in a packet form. Only the optical star coupler 10 is installed between the clients ONU#1 through #3 and the OLT 11, and an active apparatus such as an optical amplifier is not installed. The individual clients ONU#1 through #3 send out optical packet signals at timings determined between themselves and the OLT 11.

Here, an optical packet signal sent from each of the clients ONU#1 through #3 is input to the optical star coupler 10 with a different loss caused by each transmission path because the characteristic and/or length of an optical transmission path connecting between each of the clients ONU#1 through #3 and the optical star coupler 10 are different. That is, an optical packet signal propagating through a transmission path with a low loss remains as a high optical power when it is mixed with other optical packet signals at the optical star coupler 10, while one propagating through a transmission path with a high loss remains as a low optical power when it is mixed with other optical packet signals at the optical star coupler 10. Therefore, optical signals sent from the optical star coupler 10 to the OLT 10 are burst signals with different optical powers for each of the packet signals.

In such a burst telecommunication, since optical powers of optical packet signals from individual client ONU #1 through #3 are different, it is possible to obtain information of the path from each client in real time if an optical power of each optical packet signal can be monitored for each packet. Therefore, it is desired to measure an optical power for each packet in the above described PON telecommunication system.

A conventional power monitor is mainly the function of monitoring an average optical power of an optical signal over a predetermined time period and outputting it, whereas a function of monitoring an optical power for each packet is a technique that is not conventionally available.

A patent document 1 has noted a technique for receiving a preamble bit preceding a burst signal and controlling an amplifier for a PON system.

[Patent document 1] Japanese Patent Application Publication No. 2000-151290

Since an optical signal intensity-modulated causes a difference of optical power between a "0" sign and a "1" sign, an input optical power is specified by an intermediate optical power between the "0" and "1". However, if long bits of the same sign are included in a data part of an optical packet, the average optical power is biased toward an optical power of the "0" or "1", hence making impossible to evaluate an intermediate value during such a period.

SUMMARY OF THE INVENTION

The object of the present invention is to provide an optical power monitor capable of correctively measuring an optical power for each packet for use in an optical telecommunication system in which an optical power is different in each packet.

According to the present invention, an optical power monitor for use in an optical telecommunication system in which an optical signal is transmitted and received in a packet format comprises an integration unit for integrating an electrical signal corresponding to an intensity of an optical signal with a mark ratio at the head of a packet being shorter time constant than a fixed time length; and an obtaining unit for obtaining an integration value of the integration unit to make it an optical intensity of a measurement target packet according to an instruction of the integration unit.

The present invention is contrived to enable a high accuracy monitoring of an optical power for each packet and a real time obtainment of information of a path connecting between each client, which is the transmitter of the packet, and an OLT in the OLT for use in a PON telecommunication system.

BRIEF DESCRIPTION OF THE DRAWINGS

FIG. 3 is a configuration block diagram of an optical reception unit according to an embodiment of the present invention;

DESCRIPTION OF THE PREFERRED EMBODIMENTS

Figure 1:
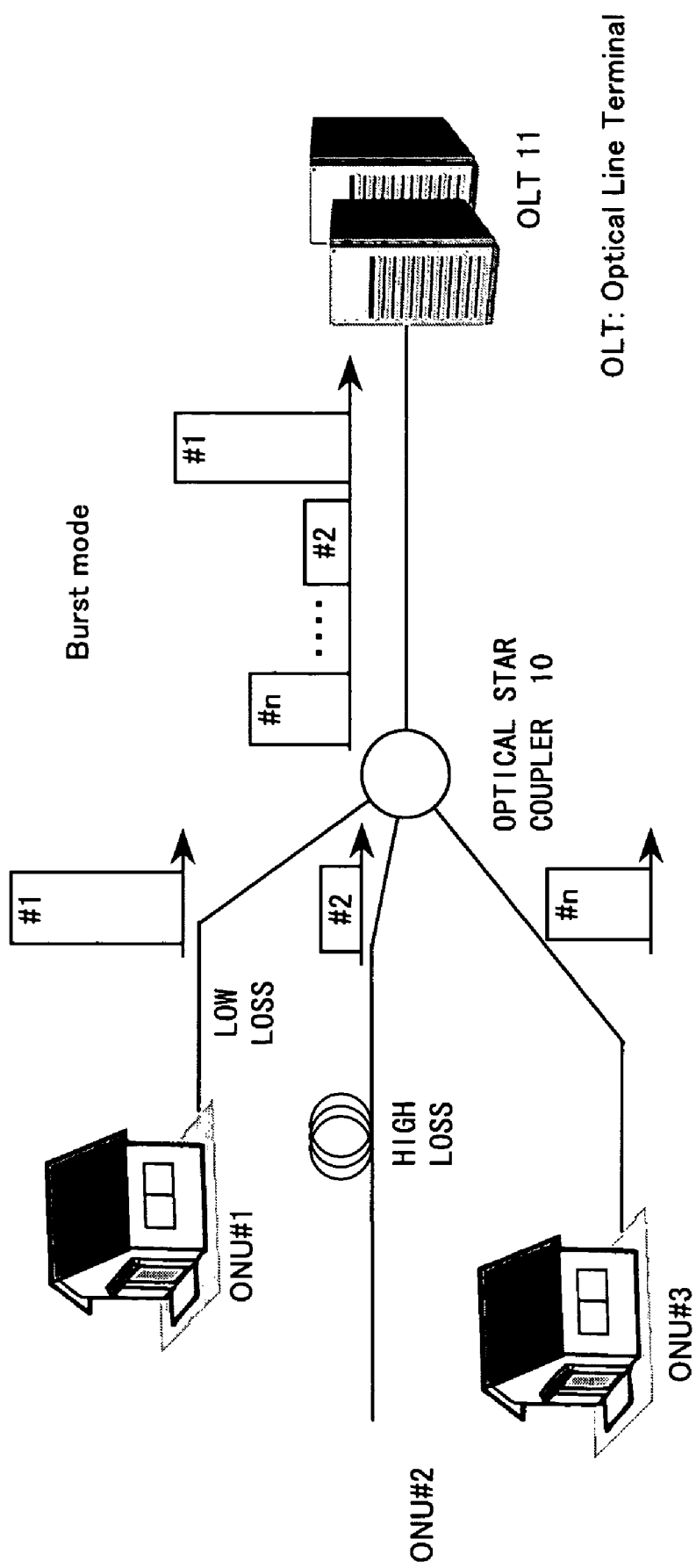
FIG. 1 is a diagram describing a PON telecommunication system.
Figure 2:
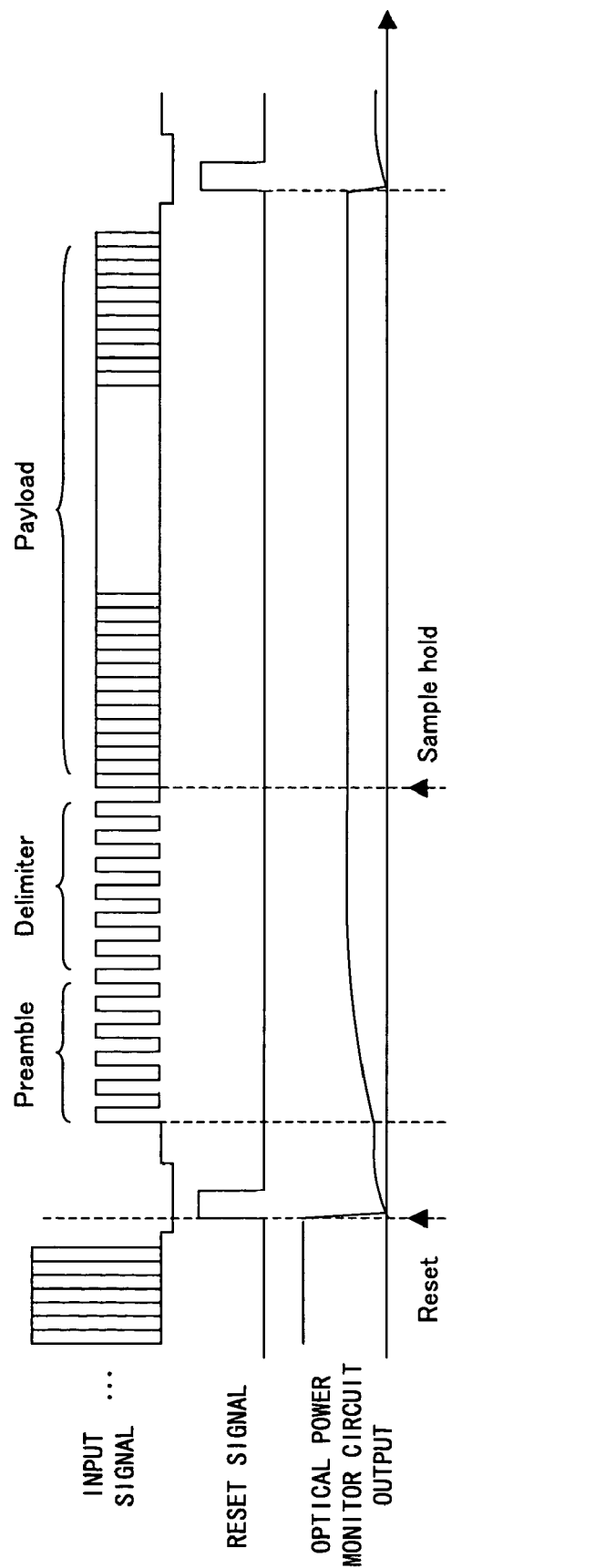
FIG. 2 is a diagram describing an embodiment of the present invention.

FIG. 2 is a diagram describing an embodiment of the present invention.

The header part of a packet includes a time zone of a fixed length called "preamble" and "delimiter" in which "1" and "0" signs appear approximately equally. The "preamble" is a field for synchronizing data (i.e., adjusting a threshold so as to enable a correct detection of the signal values "1/0") and extracting a clock, while the "delimiter" is a field indicating a start of a frame in the head of a packet. The delimiter is followed by a payload part in which the appearance of "1/0" signs depends on a data content. And a measurement of an average optical power across the field obtains a measurement value of an approximate intermediate value between "1" and "0" of an optical packet signal in the field, such as preamble and delimiter, in which "1/0" signs appear approximately equally. Accordingly, a monitoring of an optical power only within the time period of the header part comprising the preamble and delimiter and a retaining of an optical power in the payload part avoid a bias (i.e., an error) in a measurement value of an optical power occurring at the payload part. This in turn enables a correct measurement of the optical power for each packet as an intermediate value of 1/0 signs.

FIG. 3 is a configuration block diagram of an optical reception unit according to the embodiment of the present invention.

An optical packet signal is input to an optical/electrical conversion circuit 15 for being converted into an electrical signal. The optical/electrical conversion circuit 15 transmits a packet which is converted into an electrical signal to a power monitor circuit 16. A reset signal generation/output unit 19 transmits a Reset signal to the power monitor circuit 16 and a clock counter 20. The power monitor circuit 16 and clock counter 20 are reset by the Reset signal which is the one inserted between packets without exception, and the one for indicating the completion of a packet, on the system side. The Reset signal is the one resetting a receiver at every completion of packet and for making the receiver ready. The clock counter 20 transmits a monitor hold signal to the power monitor circuit 16. The monitor hold signal is output approximately at the end of the delimiter. Having received a Reset signal, the clock counter 20 starts counting, detects the end position of the delimiter by a count value and generates a monitor hold signal. The power monitor circuit 16 outputs a monitor value at the current time to a power monitor arithmetic operation circuit 17 which then calculates an optical power from the output of the power monitor circuit 16 and stores it in an external output memory 18.

Figure 4:
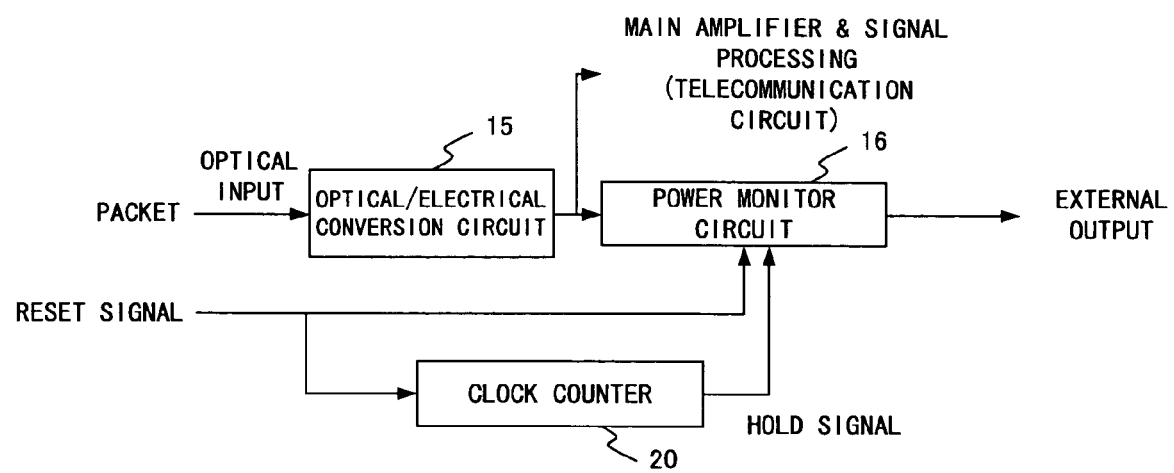
FIG. 4 is a diagram showing an extraction of a configuration only pertaining to a power monitor and its periphery according to an embodiment of the present invention.

FIG. 4 is a diagram showing an extraction of a configuration only pertaining to a power monitor and its periphery according to the embodiment of the present invention.

With a Reset signal inserted between packets as trigger, initiated are a resetting of the power monitor circuit 16 and a starting of counting the clock. The clock counter 20 outputs a hold signal at a predetermined time length after detecting a Reset signal. That is, the configuration is in a manner to output the hold signal before the clock count value passes the end of a delimiter, since the clock count value from a Reset signal to the end of a delimiter is predetermined. The power monitor circuit 16 is configured to rise in the time range in the preamble zone and delimiter zone, and have a time constant so as to obtain an average power between the preamble and delimiter. For example, it is configured to have a time constant of 0.8t where "t" is the time of a zone combining the preamble and delimiter.

Figure 5:
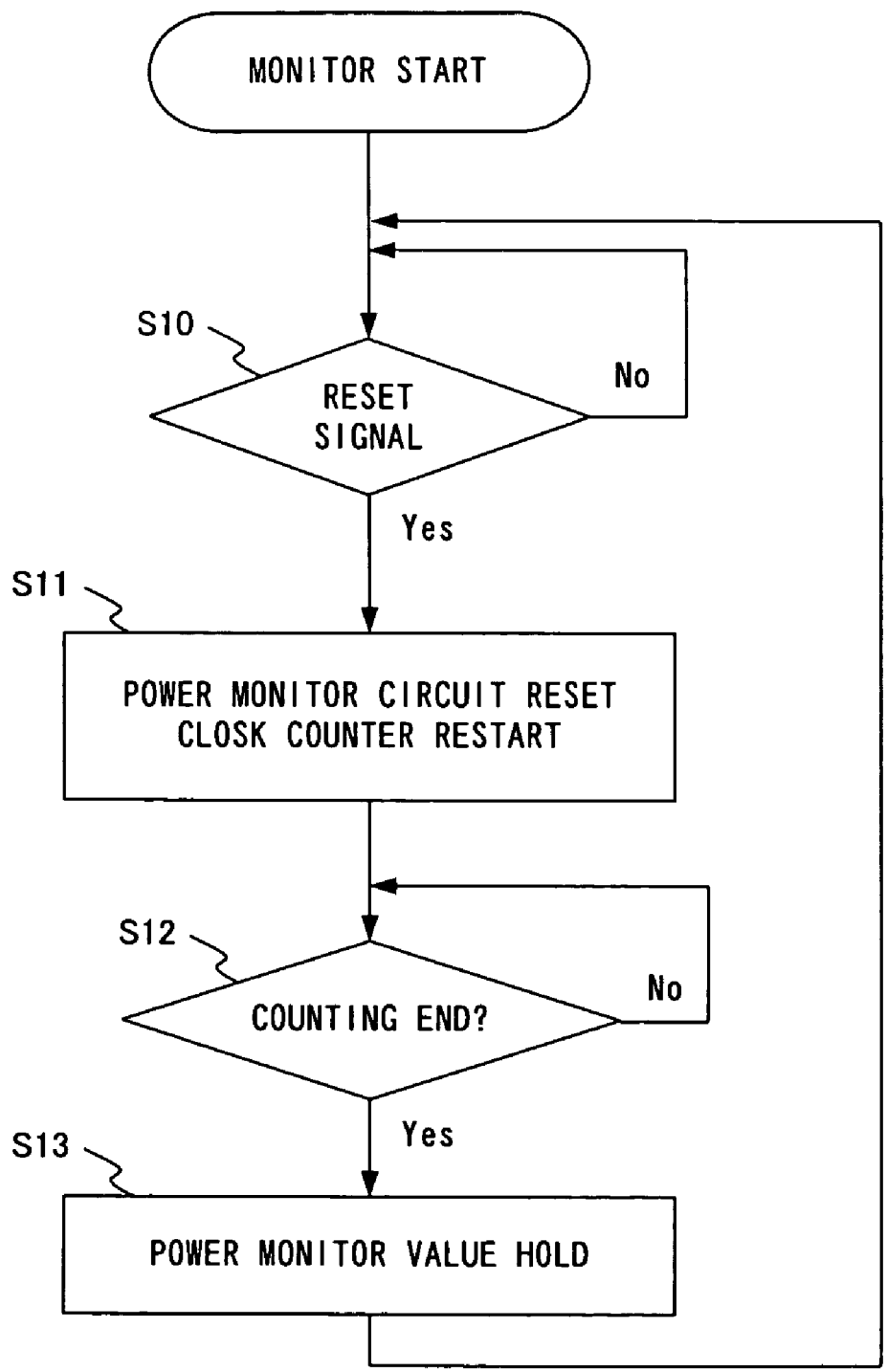
FIG. 5 is a flow chart showing an overall operation flow of an embodiment of the present invention.

FIG. 5 is a flow chart showing an overall operation flow of the embodiment of the present invention.

First, before inputting a packet signal, the Reset signal generation/output unit 19 generates and outputs a Reset signal. Therefore, the step S10 is to wait for a Reset signal being generated and output. Then in the step S11, with the Reset signal as trigger, a hold output value of the power monitor circuit 16 is reset and the clock counter 20 starts counting. The time constant of the power monitor circuit 16 is designed so as to stabilize an output between packet header parts, the power is stabilized at the clock counter which generates and outputs a hold signal before the end of the header part and holds the output of the optical power monitor circuit 16. That is, in the step S12, waiting for the clock counter 20 counting up to a predetermined count value and upon counting up, the power monitor circuit 16 holds the power monitor value, in the step S13. The above described operation continues during the operation of the telecommunication system.

Figure 6:
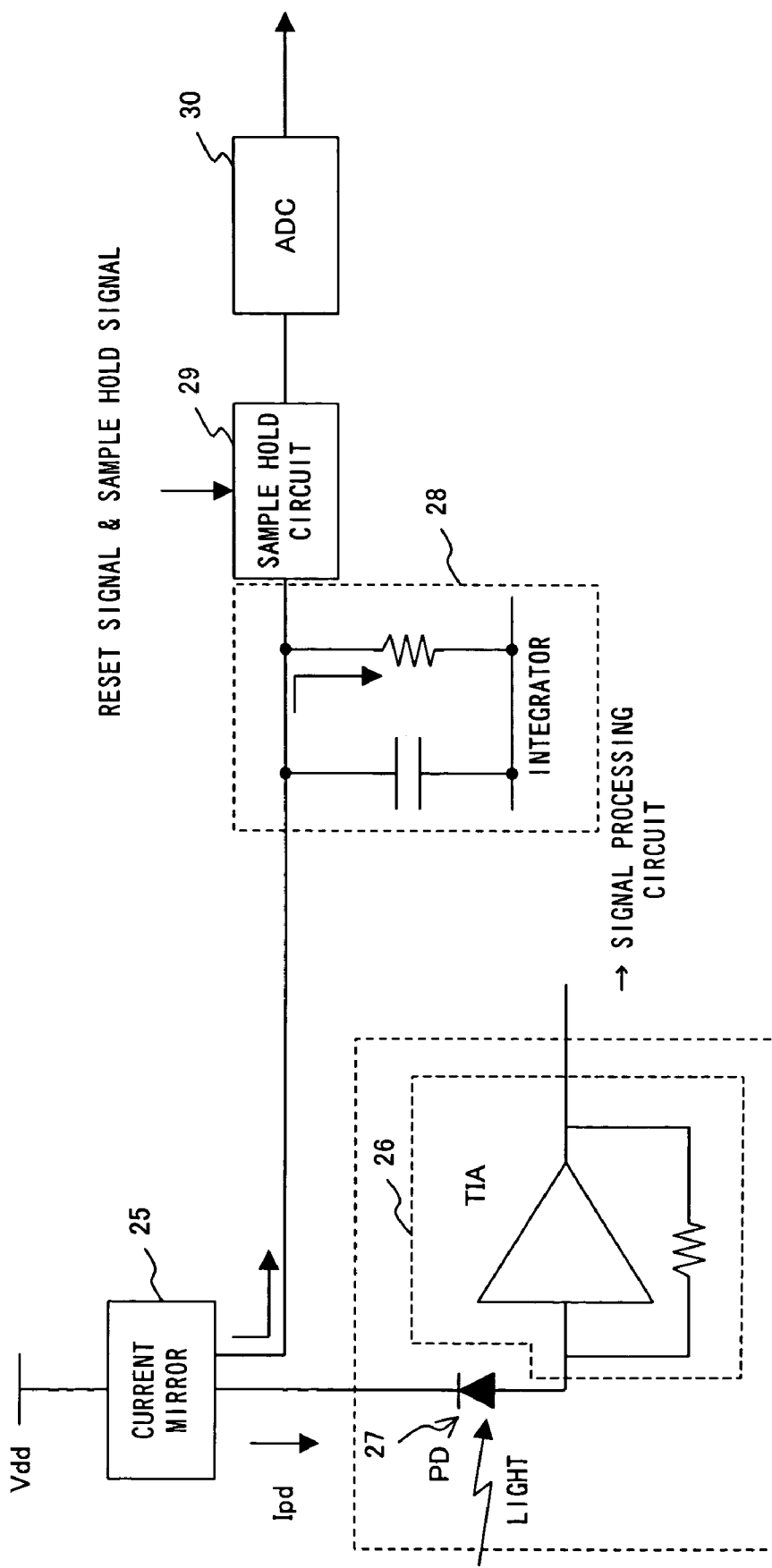
FIG. 6 exemplifies a circuit configuration of a power monitor circuit.

FIG. 6 exemplifies a circuit configuration of a power monitor circuit.

A current mirror 25 is connected to a power supply voltage Vdd, and a photo diode PD27 is connected to one terminal of the current mirror 25. The photo diode PD27 converts a received optical signal into an electrical signal. The electrical signal is intensity-modulated, and a current Ipd proportional to an optical intensity input to the photo diode PD27 flows therein. The current Ipd which has flown in the photo diode PD27 is connected to the ground, while it is omitted in the delineation of the drawings. The current Ipd becomes the one converted into an electrical signal from the optical signal. The signal converted into the electrical signal by the photo diode PD27 is amplified by a trans-impedance amplifier (preamplifier) 26 and transmitted to a signal processing circuit at a later stage. Meanwhile, the current which has flown in the photo diode PD27 is duplicated by the current mirror 25 to appear in another terminal which is connected to an integrator 28. The integrator 28 has a time constant possessing a predetermined value of a time from a Reset signal to the end of a delimiter as described before, and integrates, at the time constant, an electrical signal corresponding to an intensity of light transmitted from the current mirror 25. A sample hold circuit 29 samples, and holds, an integration value of the integrator 28 at the timing before the end of the delimiter. This configuration obtains an integration value corresponding to an average optical intensity between "1" and "0" of an optical signal. The signal value held by the sample hold circuit 29 is an analog value and therefore an analog-digital converter 30 converts the analog value into a digital value and outputs it.

What is claimed is:

1. An optical power monitor for use in an optical telecommunication system in which an optical signal is transmitted and received in a packet format, comprising:
    an integration unit for integrating an electrical signal corresponding to an intensity of an optical signal with a shorter time constant than a fixed time length of the head part of a packet with a fixed mark ratio; and
    an obtaining unit for obtaining an integration value of the integration unit to make it an optical intensity of a measurement target packet according to an instruction of the integration unit.

2. The optical power monitor according to claim 1, wherein said optical telecommunication system is a passive optical network.

3. The optical power monitor according to claim 2, wherein said passive optical network is implemented with an optical burst telecommunication system.

4. The optical power monitor according to claim 1, wherein said optical signal includes a reset signal generated in between packets, and
    said integration unit resets itself, and starts counting, upon receiving the reset signal.

5. The optical power monitor according to claim 1, wherein said integration unit comprises a clock counter and inputs a trigger signal to said obtaining unit for obtaining an integration value upon completion of counting up to a predetermined number.

6. The optical power monitor according to claim 1, wherein said integration unit comprises
    an optical/electrical conversion unit for converting an optical signal into an electrical signal,
    a current mirror unit for duplicating the same electrical signal as the electrical signal,
    an integration unit for integrating a signal from the current mirror unit, and
    a sample hold unit for sampling, and holding, an integration value of the integration unit.

7. The optical power monitor according to claim 1, wherein said power monitor is equipped in a termination apparatus of said optical telecommunication system.

8. The optical power monitor according to claim 1, wherein said optical telecommunication system is implemented with an optical intensity modulation system, and
    signs of "0" and "1", occur in approximately the same ratio in a header part.

* * * * *